United States Patent [19]

Knippel

[11] 4,291,631

[45] Sep. 29, 1981

[54] RAILWAY CAR SIDE DISCHARGE DOOR LOCKING ARRANGEMENT

[75] Inventor: Willis H. Knippel, Palos Park, Ill.

[73] Assignee: Pullman Incorporated, Chicago, Ill.

[21] Appl. No.: 33,586

[22] Filed: Apr. 26, 1979

[51] Int. Cl.[3] ........................ B65G 67/00; B61D 7/00; B61D 19/00

[52] U.S. Cl. ................................ 105/252; 105/241.2; 105/308 P; 292/216; 414/387

[58] Field of Search ............... 298/35 R, 38; 292/162; 414/387, 388; 105/241.1, 241.2, 251, 252, 308 E, 308 P, 308 B, 308 R

[56] References Cited

U.S. PATENT DOCUMENTS

| | | | |
|---|---|---|---|
| 679,033 | 7/1901 | Peteler . | |
| 1,470,149 | 10/1923 | Davis . | |
| 2,430,517 | 11/1947 | Lunde | 105/241.2 |
| 3,633,722 | 1/1972 | Miller . | |
| 3,695,662 | 10/1972 | Ploughman | 292/216 |
| 3,773,194 | 11/1973 | Schuller . | |
| 3,789,722 | 2/1974 | Bullard | 105/251 |
| 4,051,960 | 10/1977 | Raksanyi | 414/387 |
| 4,073,520 | 2/1978 | Tsuchiya | 292/216 |
| 4,138,948 | 2/1979 | Korolis | 105/252 |

*Primary Examiner*—Robert B. Reeves
*Assistant Examiner*—Brian Bond
*Attorney, Agent, or Firm*—Richard J. Myers; Stephen D. Geimer; Paul A. Kerstein

[57] ABSTRACT

The side discharge doors of a railway hopper car are maintained in a closed and locked position by a rotatable latch element which is engaged by a stop and lock member. The stop and lock member is connected to a linkage rigging arrangement which is moved by a ground actuated operating and tripping mechanism. The tripping mechanism includes a cam actuated arm which by linkage means transmits vertical movement to horizontal movement of the linkage rigging which actuates the latch and locking members of the doors.

13 Claims, 7 Drawing Figures

RAILWAY CAR SIDE DISCHARGE DOOR LOCKING ARRANGEMENT

BACKGROUND OF THE INVENTION

1. Field of the Invention

The present invention broadly relates to railway hopper cars having side discharge openings. More specifically the invention relates to an improved ground operated tripping mechanism and linkage rigging which is adapted to control the opening and closing of the side discharge doors of the car.

2. Description of the Prior Art

Early patents in the prior art include U.S. Pat. No. 679,033 issued July 23, 1901. This patent discloses a ground operated tripping mechanism which by means of bell crank levers and linkages actuates the latch element to permit the discharge or opening of the doors. U.S. Pat. No. 1,470,149 issued Oct. 9, 1923 is similar to the aforementioned patent and discloses a ground operated tripping mechanism which is adapted to actuate a ratchet wheel for releasing a door opening mechanism. The above patents do not include the novel locking arrangement nor the specific and particular combination of the present invention. Later patents include U.S. Pat. Nos. 3,633,772 and 3,773,194. Neither of these patents discloses the claimed door locking mechanism nor the specific linkage rigging and ground actuated operating mechanism which is claimed.

SUMMARY OF THE INVENTION

The hopper car of the present invention is provided with a side discharge opening which includes a door hingedly connected to the car for outward swinging movement when the door is released from a locking mechanism. The locking mechanism includes the rotatable latch member which is provided with a keeper receiving recess and which engages the keeper mounted on the door to maintain the same in a locked position. A locking member or pawl is pivotally supported above the latch member and includes a stop which is moved into position with a stop on the latch for positively locking the latch in the engaged position with the keeper. The locking pawl is actuated by a linkage mechanism extending laterally and longitudinally which in turn is connected to a ground operated tripping mechanism. The tripping mechanism includes a vertically movable arm supported on parallel linkage members and is provided at its lower end with a cam which upon engagement with a cam positioned beneath the car on the ground will move the arm upwardly thereby moving suitable linkages connected to the linkage arrangement which will transmit the vertical movement into longitudinal force thereby moving the linkages longitudinally and laterally in turn actuating the locking member from its lock to release position. As the locking member is so moved to a release position the weight on the door of the materials which are contained within the hopper swings the door open and the latch is moved to a cocked position by means of an overcenter spring arrangement whereupon simultaneously the keeper member is released and the door is of course moved to the open position. The door is provided with a roller and when the car is moved adjacent to a side of track door closing mechanism it engages the roller and swings the door back to its closed position as the keeper engages the keeper opening of the latch the same is rotated into its locked position the overcenter biasing or spring device urging the latch to move into the said position. Simultaneously, the stop on the latch is engaged with the stop on the lock pawl thereby firmly retaining the mechanism in its locked position.

Figure 1:
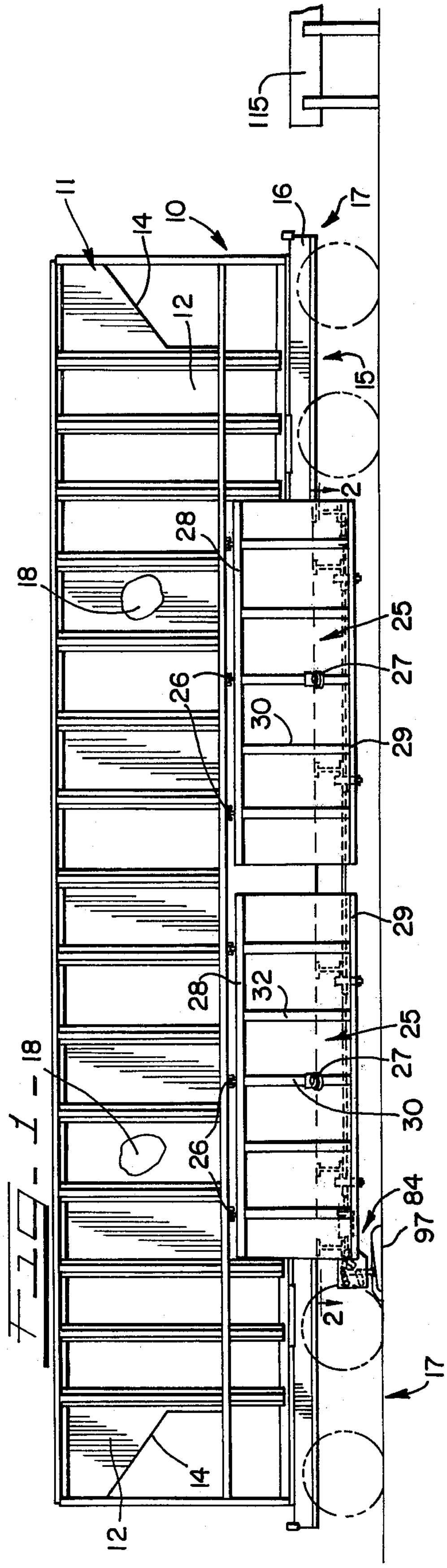
FIG. 1 is a side elevational view of a railway hopper car including the door operating mechanism of the subject invention.

Referring particularly to FIG. 1 a railway car 10 includes a car body 11, side walls 12, side sills 13, and end walls 14. The car 10 is of the open top hopper type such as may be utilized for the transport of coal and other similar material. The car 10 comprises an underframe structure 15 including a longitudinally extending center sill suitably supported at opposite ends thereof on car trucks 17 having wheels 17'. The car body includes hopper structures in longitudinally spaced relation and disposed on opposite sides of the center sill. Thus four substantially individual hoppers are disclosed, the hoppers being longitudinally spaced on one side and laterally spaced on opposite sides of the car. Each hopper structure 18 comprises a sloping wall 19 for directing material outwardly of the car. The sloping wall 19 is suitably supported by means of reinforcing angles 20 on the underframe 15. The sloping wall 19 at its lower ends is also provided with a longitudinally extending reinforcing angle 21 as best shown in FIG. 3.

Each hopper structure 18 includes a discharge opening 22 the said hopper having suitable end walls 23. The hopper structure 18 is supported on cross channels or bearer members 24 which are suitably connected to the underneath sides of the center sill 16. As best shown in FIG. 1 longitudinally spaced pairs of doors 25 are supported on the sides of the car adjacent to the discharge openings. The doors are hingedly connected to the side sills 13 of the car by means of hinge brackets 26. Each of the doors also is provided with a roller 27, the purpose of which will be described. Each door 25 includes upper longitudinal structural members 28 and lower longitudinal structural members 29. Transverse gussets or stiffeners 30 are connected to the structural members 28 and 29 and are longitudinally spaced along the length of the door a suitable panel sheet 31 is connected to the structural members and provides for the load support of the door when it is in its closed position. As best shown in FIG. 3 the lower end of the panel sheet 31 also projects outwardly and upwardly diagonally to provide for closure of the door with respect to the slope sheet 19 and discharge opening 22.

Figure 3:
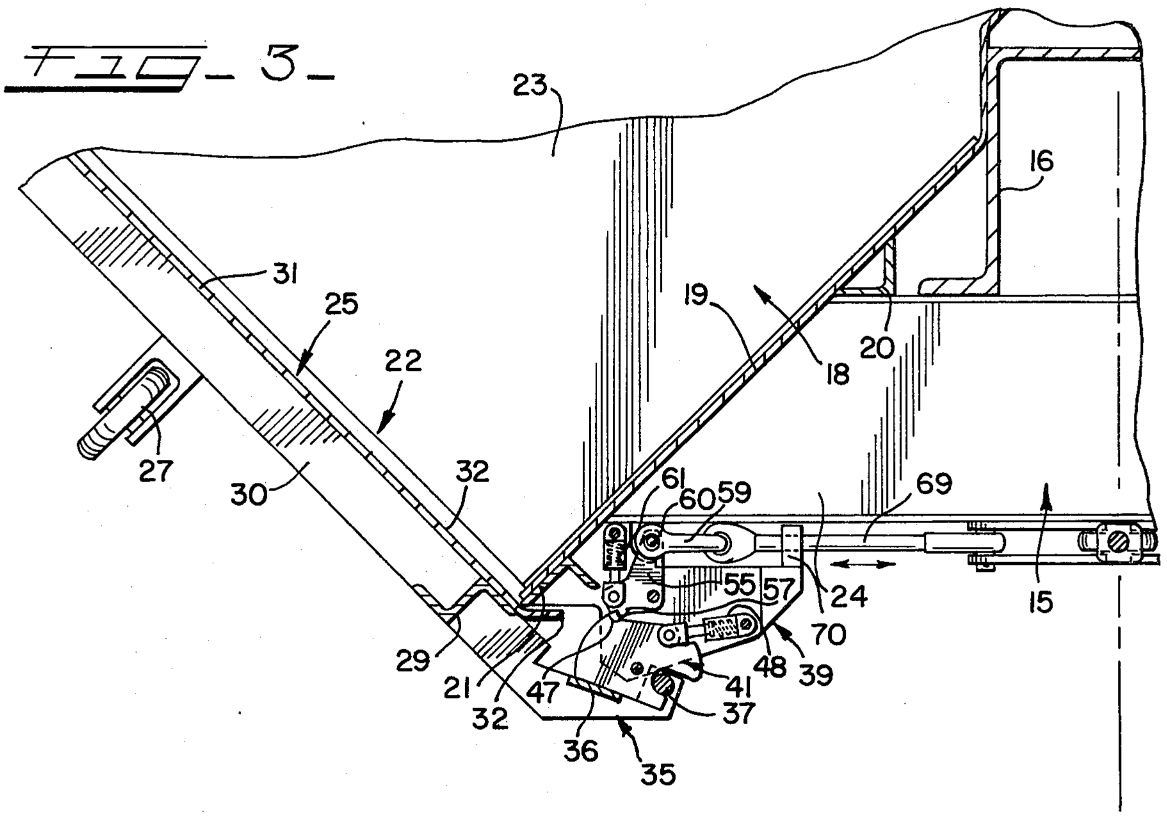
FIG. 3 is a partial cross-sectional view in elevational of the hopper car of FIG. 1 showing the door locking mechanism of the subject invention mounted beneath the underframe of the hopper car.
Figure 4:
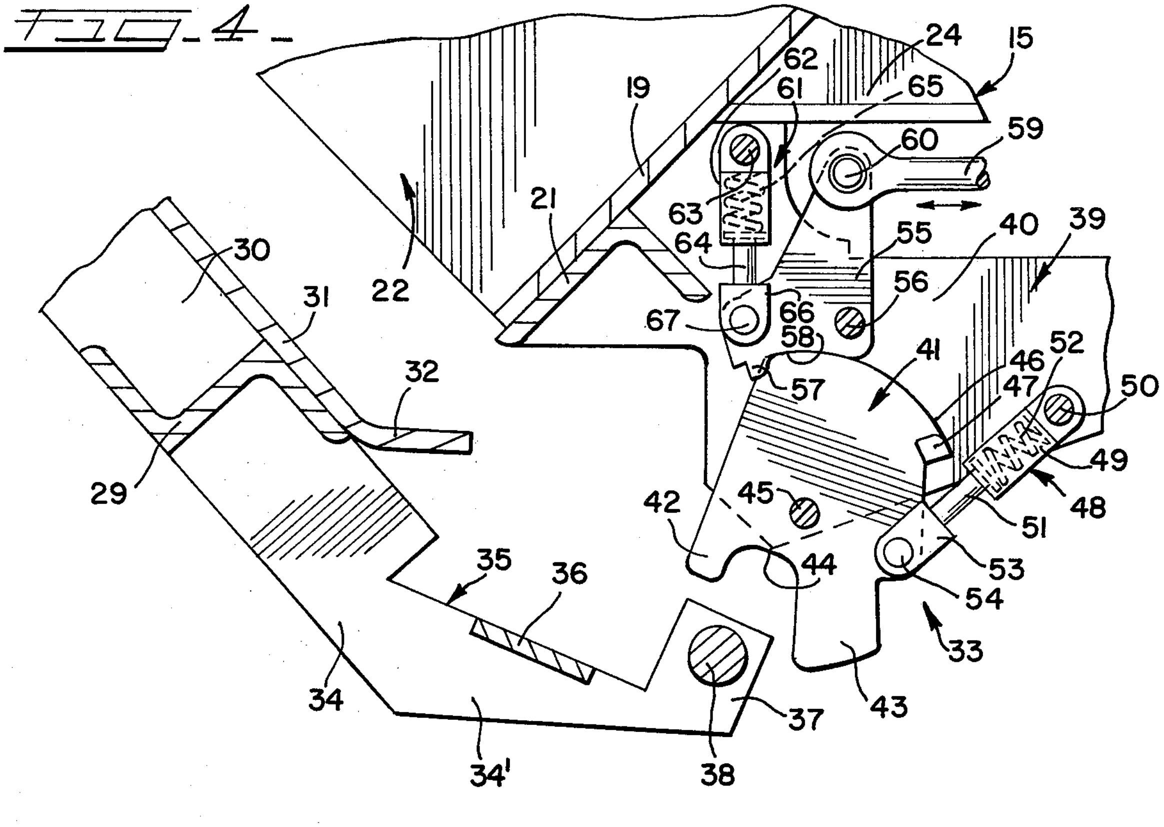
FIG. 4 an enlarged view of the door locking mechanism as shown in FIG. 3.

Referring now particularly to FIGS. 3 and 4 a door locking mechanism 33 is disclosed. The door 25 is provided with a keeper bracket 34 comprising laterally spaced plates 34' which are suitably connected to the structural member 29 and project downwardly with respect thereto.

A transverse plate 36 connects the keeper bracket 34 in a recess 35. The plates 34 also include projecting ears 37 to which is connected a longitudinally extending keeper bar 38.

The door locking mechanism 33 further includes a bracket structure generally designated at 39 which includes a vertical plate 40 suitably connected to the hopper structure 18 and to the channels 24. The latch member 41 is provided with a pair of spaced projections 42 and 43 which define a keeper receiving slot 44. The latch member 41 is mounted for pivotal movement by means of a pivot 45 on the vertical plate 40. The upper end of the latch 41 is provided with an arcuate edge 46 which at one end is provided with a stop recess 47. A biasing member 48 includes a tubular housing 49 which is pivotally connected to the bracket structures 39 by means of a pivot 50. The tubular housing 49 supports a piston and piston rod assembly 51 and a spring 52 urging the piston rod assembly outwardly. The clevis 53 attached to the end of the piston rod assembly 51 is pivotally supported as indicated at 54 on the latch member 41.

Figure 2:
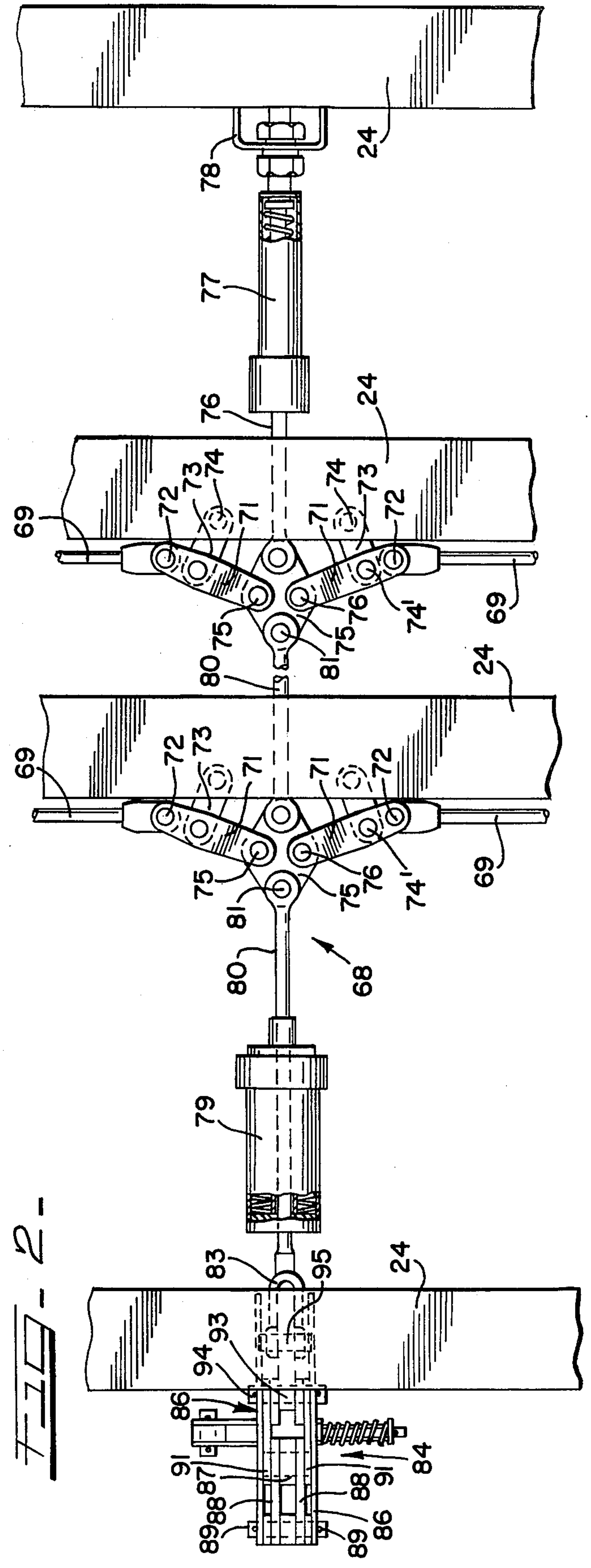
FIG. 2 is a top fragmentary of the longitudinal linkage actuating arrangement of the subject invention mounted on the underframe of the railway car depicted in FIG. 1.

As best shown in FIG. 4 a locking member or pawl 55 is pivotally supported at 56 on the bracket structure 39. The lower end of the pawl 55 includes a projecting stop 57 which is adapted in a locked position to engage the stop 47 on the latch member 41. The locking member 55 also includes a lower arcuate edge 58 which is complemental to and is adapted to ride upon the arcuate edge 46 of the latch member 41. A spring biasing member 61, similar to the member 48 includes a tubular body 62 and is pivotally connected to the bracket structure 39 by means of a pivot member 63. The biasing member 61 also includes an outwardly projecting piston and piston rod assembly 64 urged outwardly by means of a spring 65. The end of the piston rod assembly 64 includes a clevis 66 which by means of a pivot 67 is connected to the locking member 55. As best shown in FIG. 4 the link 59 is connected to the upper end of the pawl 55 by means of the pivot 60. The link 59 is connected to a linkage arrangement generally designated by the reference character 68 as best shown in FIG. 2. The linkage arrangement 68 includes links 69 which extend through the guide 70, as best shown in FIG. 3 in sliding relation, the guide 70 being supported on the bracket structure 39.

As best shown in FIG. 2 the links 69 extend laterally and are pivotally connected to links 71 by means of pivots 72. The links 71 also are connected for pivotal movement on links 73 supported on the frame members 24 by means of pivots 74. The other ends of the links 73 are connected to the links 71 by means of pivots 74'. The links 71 are pivotally connected as indicated at 76 to tension plates 75. One of the tension plates 75 at the foremost end is connected to a bracket 78 supported on the cross member 24. A spring tension unit 77 of conventional construction and a second tension device 79, containing dished springs, continually exerts a tensioning or pulling force on the links 80 and 76 which is imparted to the tension plates 75 and to the transversely extending links 69. In other words the spring arrangements 77 and 79 provide a force urging the links 69 to the position of the locking member 55 shown in FIG. 4.

Figure 5:
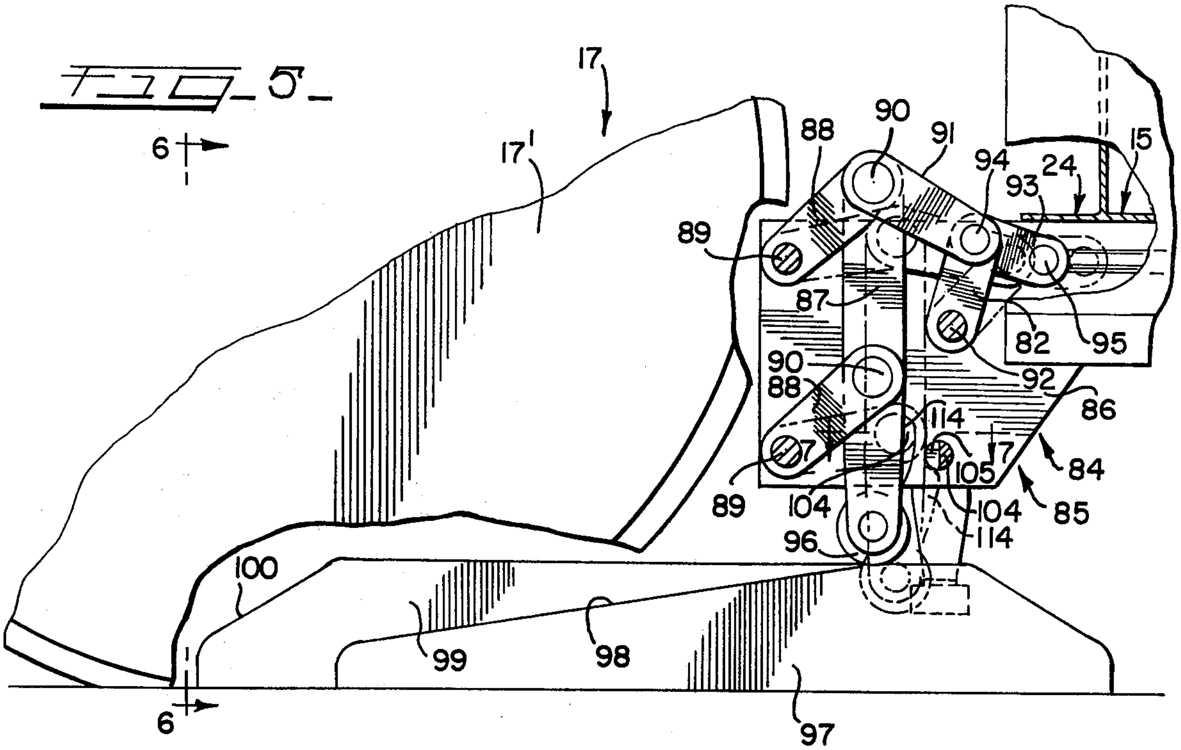
FIG. 5 is partial elevational view showing the cam actuated linkage mechanism of the subject invention shown mounted on the underframe of the hopper car of FIG. 1.

The links 80 are connected, as best shown in FIG. 2 on the left hand side to a clevis 83 in turn connected to a link 93, as best shown in FIG. 2, which is pivotally connected as indicated in FIG. 5 by means of a pivot 94 to a link 91. The links 80 are connected to the plates 75 by means of pivots 81. The linkage actuating mechanism 84 as best shown in FIGS. 2, 5, 6 and 7 includes a bracket structure 85 suitably connected to one of the cross channels 24. The mechanism also is provided and is connected to the center sill 15 of the car. The bracket structure 85 comprises a pair of spaced plates 86 between which is supported a vertical arm 87 by means of parallel links 88 which are pivotally connected as indicated at 89 to the bracket structure 85. The links 88 are also connected to the arm 87 by means of pivots 90 and are in turn connected to a link 91 which are pivoted as indicated at 94 to a link 93 pivotally connected as indicated at 95 to the clevis 83. A link 82 also connected to the pivot 94 is pivotally connected as indicated at 92 to the spaced plates 86.

Figure 6:
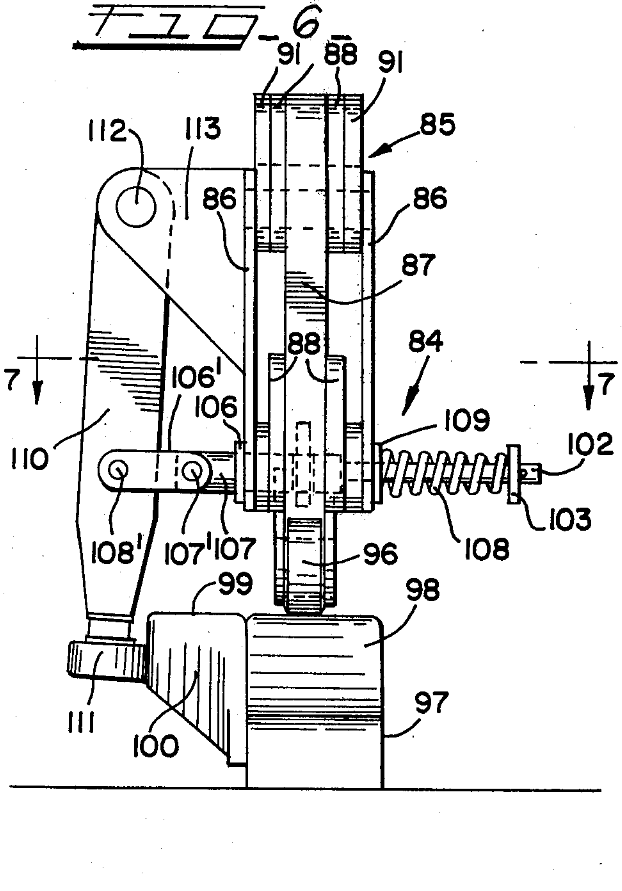
FIG. 6 is a view taken along line 6—6 of FIG. 5.
Figure 7:
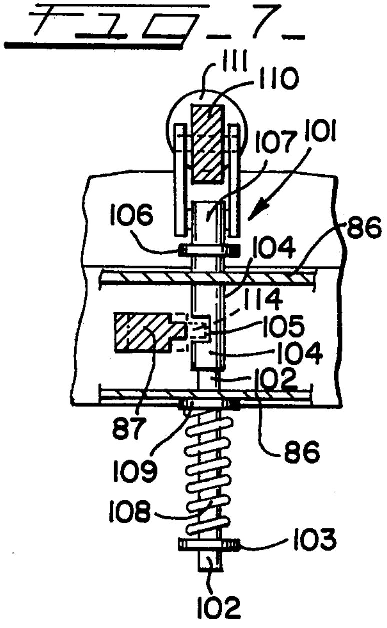
FIG. 7 is a view taken along line 7—7 of FIG. 6.

As best shown in FIGS. 5 and 6 a follower wheel 96 is pivoted on the lower end arm 87. The follower wheel 96 is adapted to roll upon the ground mounted cam 97 having a diagonal upwardly extending cam surface 98. A second lock release cam 99 is positioned side by side with respect to the ground mounted cam 97 as indicated in FIG. 5. The cam 99 has a tapering surface 100. The locking mechanism is generally designated by the reference character 101 as shown in FIG. 7. The locking mechanism 101 includes a rod 102 provided at one end with a rigid stop plate 103. The rod also includes a cylindrical stop member 104 of larger diameter than the rod 102. The rod 102 slides relative to the plates 86. The cylindrical stop member 104 includes a vertical notch 105 as best shown in FIG. 7. The rod 102 also on the other side of the plate 86 includes a rigid stop 106 connected to an extension 107. A spring 108 is held captive on the rod 102 between the stop plate 103, the washer 109 and one of the spaced plates 86. The extension 107 is connected to a pair of spaced links 106' by a pivot 107' and to a lever 110 by means of pivots 108'. The lower end of the lever 110 is provided with a roller cam 111 which as best shown in FIG. 6 is in engagement with the tapering surface 100 of the cam 99, the said surface tapering laterally outwardly and upwardly. The lever 110 is pivotally connected by means of a pivot 112 to a bracket 113 supported on one of the plates 86 as best shown in FIG. 6. As best shown in FIGS. 5 and 7 a stop projection 114 is provided on the one edge of the arm 87 adjacent to the cylindrical stop member 104 and notch 105. As best shown in FIG. 1 a door closing side of track cam 115 is provided to close the doors as will be described.

OPERATION

While the railway car 10 is moving between destinations the link actuating mechanism 84 is in the position shown in FIG. 5 in the dotted lines. In this position the notch 105 is disposed to one side of the cylindrical stop 104 so that the stop will prevent the arm from moving upwardly at this point, there being no clearance provided with the notch 105 disposed to one side of the said stop. As the unlocking cam 111 rides up on the surface 100 to the position shown in FIG. 6 the links 106' pull outwardly pulling the extension 107 outwardly to the position shown in FIG. 7 whereupon the notch 105 now is in alignment with the stop 114 and clearance is provided so that the arm 87 can be moved outwardly. The cam 96 now riding on the surface 98 pushes the arm upwardly to the solid line position shown in FIG. 5 whereupon the link 91 is moved upwardly at one end and to the left with the arm 87. As the arm 87 is moved to the left the clevis 83 and links 80 move the tension plates 75 as best shown in FIG. 2 to the left tensioning the spring arrangement 70 and 79 and this movement to the left provides for the links 69 to be moved inwardly toward the rods 80, this pulling movement of the links, as best shown in FIG. 3 pulling the link 59 whereupon the lock arm 55 is pivoted and the stop 57 is moved away and outwardly from the stop 47 of the latch member 41. The latch member 41 now is pivoted as the weight of the door and material thereon moves the keeper member 38 outwardly of the notch 44. The latch member 41 is then in the position shown in FIG. 4. Upon the clearing of the follower cam 96 from the cam 97 the tensioning devices 77 and 79 return the linkage arrangement to the position shown in FIG. 2. The load within the car has been dumped through the discharge openings and as the car moves along the closing cam 115, the cam follower rollers 27 of the doors are engaged by the cams 115 and again swung to the closed position. The doors now move upwardly from the position shown in FIG. 4 whereupon the keeper member 38 engages the notch 44 of the latch 41 which is rotated in a clockwise direction whereupon the pivot 54 of the biasing means 48, is swung to the overcenter position shown in FIG. 3 where it again is locked. The stop 57 is then moved upwardly to ride on the surface 46 against the spring biasing means 61. When the latch 41 has again assumed its completely closed position shown in FIG. 3, the stop 57 is forced by means of the spring arrangement 61 into engagement with the stop recess 47 whereupon the lock is again completely closed.

Since the linkage actuating mechanism 84 has again assumed the dotted line position of FIG. 5, wherein the arm is held locked against upper movement by means of the cylindrical stop member 104, a second lock is provided to prevent any chance of the doors becoming disengaged. This is achieved since the hinge lever 110 has again moved to a lock position with the spring 108 maintaining the cylindrical stop member 104 to one side of the stop projection 114 so that the arm 87 cannot be moved upwardly unless the lever 110 again engages the camming arrangement so provided.

What is claimed is:

1. In a railway hopper car including an underframe,
a car body supported on said underframe including a hopper structure,
a sloping wall on said hopper structure,
said hopper structure including a discharge opening,
a door hingedly connected to said body for relative swinging movement between open and closed positions, relative to said opening the improvement of a door locking mechanism comprising;
a keeper member on said door,
a rotatable latch member supported on said hopper structure,
said latch member having a keeper engaging portion in a rotated locked position being engaged by said keeper member,
a locking member pivotally connected to said hopper structure adjacent to said latch members,
said locking member having a first stop,
a second stop on said latch member engageable with said first stop to maintain said latch member in said rotated locked position relative to said keeper member,
means for pivoting said locking member between engaged and disengaged position comprising,
a linkage arrangement supported on said underframe including a link pivotally connected to said locking member,
actuating means connected to said link for moving the same in one direction to pivot said locking member,
said means including a cam follower connected to said underframe,
ground supported cam means below said cam follower engaged by said cam during movement of said car for moving said link in said one direction thereby disengaging said locking member, and
including means biasing said latch member to pivot to said locked position.

2. The invention in accordance with claim 1, including second biasing means connected to said locking member for urging the same to its engaged position.

3. In a railway hopper car including an underframe,
a car body supported on said underframe including a hopper structure,
a sloping wall on said hopper structure,
said hopper structure including a discharge opening,
a door hingedly connected to said body for relative swinging movement between open and closed positions, relative to said opening the improvement of a door locking mechanism comprising;
a keeper member on said door,
a rotatable latch member supported on said hopper structure,
said latch member having a keeper engaging portion in a rotated locked position being engaged by said keeper member,
a locking member pivotally connected to said hopper structure adjacent to said latch members,
said locking member having a first stop,
a second stop on said latch member engageable with said first stop to maintain said latch member in said rotated locked position relative to said keeper member,
means for pivoting said locking member between engaged and disengaged position comprising,
a linkage arrangement supported on said underframe including a link pivotally connected to said locking member,
actuating means connected to said link for moving the same in one direction to pivot said locking member,
said means including a cam follower connected to said underframe,
ground supported cam means below said cam follower engaged by said cam during movement of said car for moving said link in said one direction thereby disengaging said locking member,
said actuating means connected to said link including a vertically moveable arm,
means rotatably connecting said cam follower to said arm,
means connected to said arm and to said link means for transmitting vertical movement of said arm to longitudinal horizontal movement of said link means in said one direction, parallel second links pivotally connected to said underframe and to said arm,
a third link pivotally connected to said arm,
a fourth link pivotally connected to said third link,
said fourth link being rotatably supported on said underframe, and
a fifth link pivotally connected to said fourth link and to said linkage arrangement for moving said first link in said one direction.

4. In a railway hopper car including an underframe,
a car body supported on said underframe including a hopper structure,
a sloping wall on said hopper structure,
said hopper structure including a discharge opening,
a door hingedly connected to said body for relative swinging movement between open and closed positions, relative to said opening, the improvement of a door locking mechanism comprising;
a Keeper member on said door,
a rotatable latch member supported on said hopper structure,
said latch member having a keeper engaging portion in a rotated locked position being engaged by said keeper member to maintain said door in the closed position,
a locking member pivotally connected to said hopper structure adjacent to said latch member,
said locking member having a first stop,
a second stop on said latch member engageable with said first stop to maintain said latch member in said rotated locked position relative to said keeper member,
means for pivoting said locking member between engaged and disengaged position comprising,
a linkage arrangement supported on said underframe including a link pivotally connected to said locking member,
said link moving in said one direction moving laterally of said car,
said linkage arrangement including longitudinally movable link means supported on said underframe,
and means connecting said laterally moving link and said longitudinal link means for transmitting longitudinal force into lateral force for moving said first link and
actuating means connected to said link for positively moving the same in one direction to pivot said locking member, thereby moving said locking member to said disengaged position to permit said latch member to rotate out of said locked position.

5. In a railway hopper car including an underframe,
a car body supported on said underframe including a hopper structure,
a sloping wall on said hopper structure,
said hopper structure including a discharge opening,
a door hingedly connected to said body for relative swinging movement between open and closed positions, relative to said opening the improvement of a door locking mechanism comprising;
a keeper member on said door,
a rotatable latch member supported on said hopper structure,
said latch member having a keeper engaging portion in a rotated locked position being engaged by said keeper member,
a locking member pivotally connected to said hopper structure adjacent to said latch members,
said locking member having a first stop,
a second stop on said latch member engageable with said first stop to maintain said latch member in said rotated locked position relative to said keeper member,
means for pivoting said locking member between engaged and disengaged position comprising,
a linkage arrangement supported on said underframe including a link pivotally connected to said locking member,
actuating means connected to said link for moving the same in one direction to pivot said locking member,
said means including a cam follower connected to said underframe,
ground supported cam means below said cam follower engaged by said cam during movement of said car for moving said link in said one direction thereby disengaging said locking member,
said actuating means connected to said link including a vertically movable arm,
means rotatably connecting said cam follower to said arm,
means connected to said arm and to said link means for transmitting vertical movement of said arm to longitudinal horizontal movement of said link means in said one direction,
said ground supported cam means including a second cam, a second cam follower adapted to engage said second cam,
and arm locking means connected to said second cam follower for locking said arm in locked transport position, and
release means for disengaging said arm locking means during engagement of said second cam follower with said second cam whereby said arm is free to move in response to engagement of said first cam follower with said first cam.

6. The invention in accordance with claim 5,
said arm locking means including a reciprocating stop element positioned for movement transverse of said arm,
said arm having a projecting stop engaging said reciprocating stop element in the locking position, and
said second cam follower means including means moving said reciprocating stop element to a release position in response to engagement of said second follower with said second cam.

7. In a railway hopper car including an underframe,
a car body supported on said underframe including a hopper structure,
a sloping wall on said hopper structure,
said hopper structure including a discharge opening,
a door hingedly connected to said body for relative swinging movement between open and closed positions, relative to said opening, the improvement of a door locking mechanism comprising;
a Keeper member on said door,
a rotatable latch member supported on said hopper structure,
said latch member having a keeper engaging portion in a rotated locked position being engaged by said keeper member, to maintain said door in the closed position,
a locking member pivotally connected to said hopper structure adjacent to said latch member,
said locking member having a first stop,
a second stop on said latch member engageable with said first stop to maintain said latch member in said rotated locked position relative to said keeper member, means for pivoting said locking member between engaged and disengaged position comprising, a linkage arrangement supported on said underframe including a link pivotally connected to said locking member, actuating means connected to said link for positively moving the same in one direction to pivot said locking member, and said actuating means positively moves said link in tension, thereby moving said locking member to said disengaged position to permit said latch member to rotate out of said locked position.

8. In a railway hopper car including an underframe, a car body supported on said underframe including a hopper structure, a sloping wall on said hopper structure, said hopper structure including a discharge opening, a door hingedly connected to said body for relative swinging movement between open and closed positions relative to said opening, the improvement of a door locking mechanism comprising;

a Keeper member on said door, a rotatable latch member supported on said hopper structure, said latch member having a keeper engaging portion in a rotated locked position being engaged by said keeper member to maintain said door in the closed position, a locking member pivotally connected to said hopper structure adjacent to said latch member, said locking member having a first stop, a second stop on said latch member engageable with said first stop to maintain said latch member in said rotated locked position relative to said keeper member, means for pivoting said locking member between engaged and disengaged position comprising, a linkage arrangement supported on said underframe including a link pivotally connected to said locking member, said means includes a cam follower mounted on said underframe adapted to engage associated ground supported cam means during movement of said car for moving said link in one direction and actuating means connected to said link for positively moving the same in said one direction to pivot said locking member, thereby moving said locking member to said disengaged position to permit said latch member to rotate out of said locked position.

9. The invention in accordance with claim 8, said cam means on the ground having an upwardly extending sloping surface.

10. The invention in accordance with claim 8, said actuating means connected to said link including a vertically movable arm, means rotatably connecting said cam follower to said arm, and means connected to said arm and to said link means for transmitting vertical movement of said arm to longitudinal horizontal movement of said link means in said one direction.

11. The invention in accordance with claim 10, including parallel second links pivotally connected to said underframe and to said arm.

12. In a railway hopper car including an underframe, a car body supported on said underframe including a hopper structure having a discharge opening and a door hingedly connected to said body for movement between closed and opened positions relative to said opening, an improved door locking mechanism comprising:

door locking means mounted on said car body operable between locking and unlocking positions, said locking means being adapted to maintains said door in said closed position in the locking position of said locking means, first cam follower means mounted on said underframe and including linkage means operatively associated with said locking means for operating said locking means between said locking and unlocking positions, said first cam follower means being adapted to engage associated ground supported first cam means for operating said locking means to said unlocking position, and second cam follower means mounted on said underframe adapted to engage associated ground supported second cam means for movement from a locked position wherein said first cam follower means is prevented from operating said locking means, to an unlocked position wherein said first cam follower means operates said locking means upon engagement with said first cam means.

13. The invention in accordance with claim 12, and spring means for biasing said second cam follower toward said locked position.

* * * * *